No. 629,909. Patented Aug. 1, 1899.
A. B. McMILLAN.
ELECTRIC MUSCULAR EXERCISING APPARATUS.
(Application filed June 14, 1898.)
(No Model.)
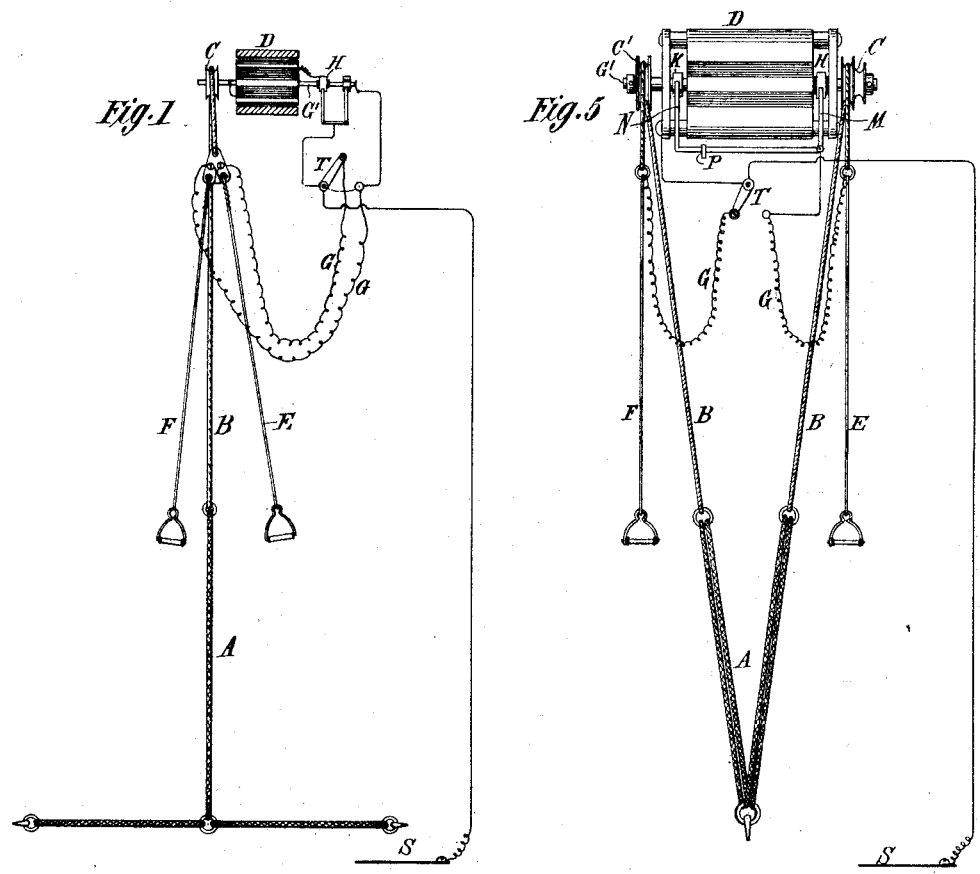
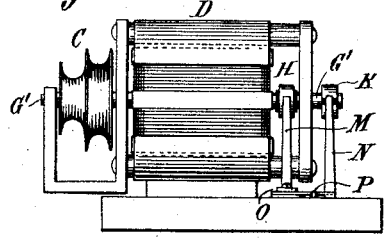
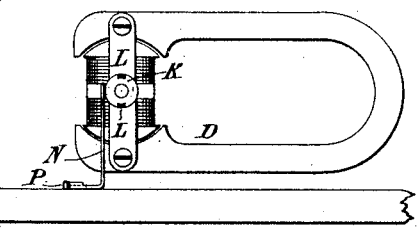
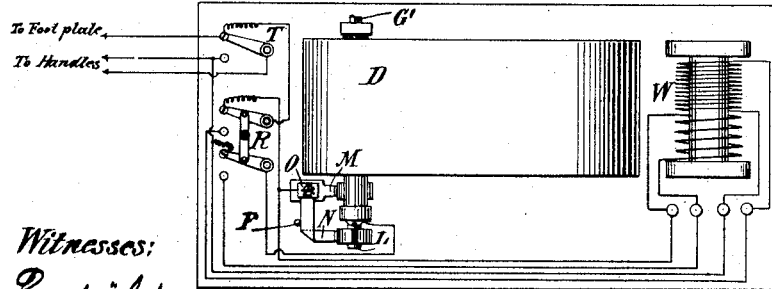
Inventor
Archie B. McMillan
by Kerr, Curtis & Page, Attys.

UNITED STATES PATENT OFFICE.

ARCHIE B. McMILLAN, OF NEW YORK, N. Y.

ELECTRIC MUSCULAR EXERCISING APPARATUS.

SPECIFICATION forming part of Letters Patent No. 629,909, dated August 1, 1899.

Application filed June 14, 1898. Serial No. 683,416. (No model.)

*To all whom it may concern:*

Be it known that I, ARCHIE B. MCMILLAN, a subject of the Queen of Great Britain, residing at the borough of Brooklyn, in the city of New York, county of Kings, and State of New York, have invented certain new and useful Improvements in Electric Muscular Exercising Apparatus, of which the following is a specification, reference being had to the drawings accompanying and forming a part of the same.

The invention subject of my present application is an improvement applicable to exercising apparatus—such as chest-weights, rowing-machines, and the like—which are provided with cords or straps arranged to be drawn over a pulley or pulleys and caused to raise weights or stretch elastic bands.

The object of the invention is to provide for the passage of an electric current or succession of electric shocks through the portions of the body of a person using the apparatus that are being exercised and to utilize a part of the power expended in exercise in generating the electrical energy applied to this purpose. I accordingly in carrying out my invention pass the strap or cord which is attached to the weight or elastic band over a pulley which imparts rotation to a small magneto-electric generator and maintain suitable electric connections between the terminals of the generator and the handle or handles attached to the cord. I also provide certain appliances which render the apparatus more effective and useful, the nature and purpose of which will be more fully hereinafter described.

In the drawings hereto annexed, Figure 1 is a diagrammatic illustration of my improved exercising apparatus. Fig. 2 is a side view of the generator. Fig. 3 is a sectional view of the generator, taken through the commutator. Fig. 4 is a diagram showing a transformer in connection with the generator and the necessary circuit connections. Fig. 5 shows a modified form of the apparatus of Fig. 1.

In Fig. 1, A designates any resisting device, such as one or more elastic cords secured to a fixed support and attached to an ordinary cord or strap B. This latter is carried up over a pulley C on the shaft of or in gear with the armature of a small magneto-generator D, mounted in any convenient manner. To the end of the cord B are attached straps or bands E F, containing or composed of electric conductors, to which are connected flexible conductors G, leading from the terminals of the generator D and of such lengths as to permit without becoming taut the cord B to be drawn out to its fullest extent. With this arrangement when the cord B is drawn over the pulley a current is developed in the armature-coils of the generator that passes from one handle to the other through the body of the person exercising, and similarly when the cord is drawn back by the reaction of the elastic band.

The ends of the armature-winding are connected to the shaft G' and to an insulated ring H, respectively, and the conductors which convey the currents to the handles are connected with these two parts of the generator in any ordinary way; but inasmuch as it is desirable to use a small and inexpensive magneto-machine the current from which is comparatively feeble, I make special provision for intensifying its effects by using a circuit-breaker such as is illustrated in Figs. 2 and 3. In these figures K is a ring mounted on the shaft G and provided with insulating-segments L. A brush M bears upon the ring H, and another brush N bears on the ring K. The two brushes are electrically connected and the ring K is in electrical contact with the shaft G'. The wires for the outer circuit are taken from the brush M and the shaft, respectively, as terminals. With this arrangement the armature-winding is short-circuited when brush N is in contact with the metal ring K, but broken momentarily twice at each revolution at the instant that each pulsation of current is at its maximum strength. At each break the electromotive force of self-induction, which is much higher than the initial electromotive force, traverses the outer circuit, so that there is thus produced a succession of strong shocks. The brush N is pivoted at O, so as to be removable from contact with the ring K when it is desired to use simply the alternating current of the generator, and a pin P is employed to hold it in position when in use. The construction of the circuit-breaker is such that it operates equally well in either direction of rotation of the armature.

I may use in conjunction with the generator and either with or without the circuit-breaker a step-up transformer W to still further raise the electromotive force of the current. In such case I employ a two-way switch R, by means of which the transformer may be cut in or out of circuit. I also provide a foot-plate S, which may be used when desired, and provide a single switch T in connection therewith. When the foot-plate is not used, the switch is turned to the position shown in Fig. 4, the circuit being then completed between the two handles through the operator's arms and body. When the foot-plate is used, the switch T is turned and the circuit is then completed through both handles in parallel and the operator's arms, body, legs, and feet to the plate and back to the generator by the return-wire.

In order to provide for different frequency of the shocks, I use two or more pulleys of different diameters, as shown in Fig. 2, for the purpose of varying the speed of the generator.

Without departure from the invention, I may use two elastic bands and cords and a separate pulley for each. This is often desirable in apparatus of this kind. In such cases I mount one of the pulleys, as C', loosely on its shaft and fix the other to the armature-shaft, as shown in Fig. 5. In this form of the apparatus the generator is operated by one cord only, and the result is the same as in the other form of device described.

It will be understood that the details of the construction and arrangement of the generator and circuit connections may be widely varied without departure from the invention.

What I claim is—

1. The combination, with an exercising apparatus operated by drawing cords over a pulley, of a magneto-electric generator operated by the rotation of the pulley, the armature-windings of the generator being connected at one end to the armature-shaft, an insulated ring, H, carried by the armature-shaft to which the other end of the armature-winding is connected, an outer circuit connected respectively with the said ring and the armature-shaft, and including parts of the exercising apparatus with which the user comes in contact, and an interrupting device consisting of a conducting-ring K, connected with the armature-shaft, and formed with insulated sections, a pivoted brush bearing on said ring, the said brush having electrical connection with the ring H, and the ring K having connection with the armature-shaft, and means whereby the said brush may be held either in or out of contact with the ring K, substantially as set forth.

2. The combination, with an exercising apparatus operated by drawing cords over a pulley, of a magneto-electric generator operated by the rotation of the pulley, an outer circuit including parts of the exercising apparatus suitably connected with the generator whereby the currents developed thereby may be caused to pass through said outer circuit, an interrupting device whereby the armature-winding of the generator may be short-circuited intermittently as the armature is rotated, such interrupting device including a pivoted conducting part, whereby it may be thrown into and out of operation, a transformer for raising the potential of the current generated, and switch and circuit connections between said transformer and the generator, substantially as set forth.

3. The combination of an exercising apparatus operated by drawing cords over a pulley, and provided with a pair of handles, a magneto-electric generator operated by the rotation of the pulley of the exercising apparatus, an outer circuit including the said handles of the exercising apparatus and connected with the opposite ends of the armature-winding, a foot-plate, a circuit connection between the foot-plate and one end of the armature-winding and a switch device, whereby the connections with the handles may be arranged in series, the current then going through the arms and trunk of the user, or whereby the foot-plate may be cut into the circuit, when the current passes through both handles and the arms of the user in parallel, and thence through the trunk and legs of the user to the foot-plate, and by its circuit connection is returned to the generator, substantially as set forth.

ARCHIE B. McMILLAN.

Witnesses:
M. LAWSON DYER,
G. W. MARTLING.